United States Patent
Banik et al.

(10) Patent No.: US 8,032,893 B2
(45) Date of Patent: Oct. 4, 2011

(54) SYNCHRONIZATION OF DATA (75) Inventors: Thomas Banik, Erlangen (DE); Rainer Bitzer, Bischwiller (FR); Rainer Heller, Eckental (DE); Ronald Lange, Fürth (DE); Peter Niederhuber, Vienna (AT); Rudolf Pohlan, Waldbronn (DE)

(73) Assignee: Siemens Aktiengesellschaft, Munich (DE)

( * ) Notice: Subject to any disclaimer, the term of this patent is extended or adjusted under 35 U.S.C. 154(b) by 415 days.

(21) Appl. No.: 11/918,307

(22) PCT Filed: Apr. 7, 2006

(86) PCT No.: PCT/EP2006/061423
§ 371 (c)(1),
(2), (4) Date: Apr. 16, 2009

(87) PCT Pub. No.: WO2006/108801
PCT Pub. Date: Oct. 19, 2006

(65) Prior Publication Data
US 2009/0217312 A1    Aug. 27, 2009

(30) Foreign Application Priority Data
Apr. 11, 2005  (DE) .......................... 10 2005 016 690

(51) Int. Cl.
G06F 3/00    (2006.01)
G06F 7/00    (2006.01)
(52) U.S. Cl. ........................................ 719/313; 707/610
(58) Field of Classification Search .................. 707/610; 719/313
See application file for complete search history.

(56) References Cited

U.S. PATENT DOCUMENTS

| | | | | |
|---|---|---|---|---|
| 7,620,658 | B2* | 11/2009 | Benson et al. | 1/1 |
| 7,757,220 | B2* | 7/2010 | Griffith et al. | 717/136 |
| 7,836,103 | B2* | 11/2010 | Li et al. | 707/809 |
| 2005/0120029 | A1* | 6/2005 | Tomic et al. | 707/100 |

FOREIGN PATENT DOCUMENTS
EP  1 291 770 A2  3/2003
WO  WO 2004/112301 A2  12/2004

OTHER PUBLICATIONS

Hansmann, U. et al., "SyncML: Synchronizing and Managing Your Mobile Data", 2003, pp. i-ix, 21-34 and 103-133, Pearson Education, XP002389693, ISBN: 0-13-009369-6.
Grosso, P. Veillard, D.: "XML Fragment Interchange", W3C Working Draft, Jun. 30, 1999, pp. 1-15, XP002167090.
Ogbuji, U: "Tip: Namespaces and versioning—Using XML namespaces to mark the version of XML formats", IBM Developerworks—Internet Disclosure, (Online), Jun. 1, 2002, pp. 1-3, XP002418734, Gefunden im Internet: URL:http://www-128.ibm.com/developerworks/xml/library/x-tipnamsp.html>.
Mascolo, C. et al: "Xmiddle: a Data-Sharing Middleware for Mobile Computing", Wireless Personal Communications, Springer, Dordrecht, NL, vol. 21, No. 1, Apr. 2002, pp. 77-103, XP001115425, ISSN: 0929-6212.

* cited by examiner

*Primary Examiner* — Andy Ho
*Assistant Examiner* — Charles E Anya (57) ABSTRACT

A method and a system for the synchronization of data between applications are provided. Data is exchanged at least partially between the applications, the exchanged data being synchronized with the data that is present in the respective application. To simplify the synchronization process, according to the invention an identification that signifies incompleteness is assigned to the data.

7 Claims, 5 Drawing Sheets

SYNCHRONIZATION OF DATA

CROSS REFERENCE TO RELATED APPLICATIONS

This application is the US National Stage of International Application No. PCT/EP2006/061423, filed Apr. 7, 2006 and claims the benefit thereof. The International Application claims the benefits of German application No. 102005016690.3 DE filed Apr. 11, 2005, both of the applications are incorporated by reference herein in their entirety.

FIELD OF INVENTION

The invention relates to a method as well as a system for synchronization of data.

SUMMARY OF INVENTION

The object of the invention is to simplify the synchronization of data between applications.

This object is achieved by a method for synchronization of data between applications, in which the data is exchanged at least partly between the applications, with the exchanged data being synchronized with the data present in the respective application, with an identification that signifies incompleteness being assigned to the data.

This object is achieved by a system for synchronization of data between applications, with data being able to be exchanged at least partly between the applications, with synchronization means for synchronization of the exchanged data with data present in respective application being provided, with an identification for incompleteness being able to be assigned to the data.

In the engineering chain from product planning through to system planning and system automation there are transitions between different gateways between different sets of stored data. One of the reasons for this is a technical one since (even in the future) there will not be a product suite which will offer all aspects integrated. Another reason is the different user roles within the engineering chain which may wish to operate entirely unsynchronized at times and at defined points in time may undertake a synchronization with the stored data of the other user roles. In such cases it is important for a change to be able to be made potentially from all user roles, the synchronization of the stored data must thus in principle be able to be made multi-directionally or bidirectionally.

XML has become the dominant basic description language for structured exchange of data. However XML does not offer sufficient definitions to fully support the above-mentioned scenario. First expanded specifications have been given in the PNO specification XML@PROFIBUS (object model, administration of foreign keys, multi-language capability, . . . ).

The invention in particular addresses change management in data exchange. This includes the following use cases which cannot be adequately supported by XML alone:
  If the stored data has already been synchronized once, only the changes should be exchanged in future synchronizations.
    How can the changes be related to the project data already exchanged?
    How can deletions be communicated?
    How can object paths be passed on without duplicating the object data?
  The models of the different stored data do not typically coincide. Thus one set of stored data can only supply incomplete information for other sets of stored data.
    How will this incompleteness be expressed? In particular how will it be distinguished that an item of data in the exchange is not present because it does not know the exporting set of stored data or because the item of data has been deleted?
  On export a root object can typically be selected as from which all objects will be exported. In addition filter settings can also be defined to indicate that not all object data will always be exported.
    How can the importing application recognize which root object or which filter settings have been selected?
    How can the export files arising still be described using a uniform XML schema?
  The data schemas of the stored data sets can change.
    How can it be established on import of stored data sets whether data schema changes are present? If yes, of what type (compatible, incompatible, object-related only, . . . )?

The Specification PROFIBUS Guideline XML@PROFIBUS (PNO Order No. 2.342) only addresses change management inadequately. The present invention relates in its exemplary embodiments partly to the specifications defined in this Guideline.

The present invention and its advantageous embodiments resolve the questions specified above. The concrete XML syntax specified in the description is to be understood as an exemplary embodiment, the invention is naturally independent of this. Included in the invention or the advantageous embodiments of the invention are the following concepts:
  Identification signifying incompleteness of exported objects and attributes. This identification is also referred to as a partial identification. The identification is advantageously hierarchically assignable and/or inheritable.
  Concept of shell objects which, although they bear all the attributes (name, ID) needed for identification, are not however transmitted as full-value objects. The basis here can especially be a name hierarchy.
  Versioning concept (using XML schema version, XML namespace and data version), that the type of data changes can be detected on import of a data set and that there can be a generic reaction to this. This makes it possible for a change of a data schema of an exporting application to be possible in most cases without the import routines of the other data containers having to be changed. Advantageously a multilayer identification of the version is used.

BRIEF DESCRIPTION OF THE DRAWINGS

The invention is described and explained in more detail below on the basis of the exemplary embodiments shown in the figures.
The figures show:
FIG. 1 a basic diagram of an engineering chain,
FIG. 2 a flowchart to show the import of data,
FIG. 3 a flowchart to show the merging of objects,
FIG. 4 different options for restricting export of data,
FIG. 5 an example of name hierarchies and
FIG. 6 an example of external references.

DETAILED DESCRIPTION OF INVENTION

An exporting application can define whether it carries out a full or partial export. There are a number of scenarios for a partial export:

An application which can trace changes since a previous export can decide to only export this "Delta information", i.e. only to export the new or edited objects and attributes.

It is possible that not all data expected by an importing application is available to an external application (e.g. as a result of object model discrepancies), so that it would mark the export as partial.

If an application is not exporting its complete project but only a subtree, the parent objects of the root object (which are exported as shell objects) are partial by definition. The same then applies to any target objects of external references which can exist.

Any object in an export file can have an optional attribute PartialExport, with the possible values being "true" or "false". This attribute relates to the object itself and to all its aggregated subelements if a subobject does to possess its own PartialExport attribute. At the root object the attribute has a default value of "true".

If PartialExport of an object is false (either because this is explicitly specified in the object or because it is "inherited" from its parent object), the importing application must assume that the contains all subelements of this object. If the object already exists and contains additional subobjects which are not to be found in the import file, they should be regarded as deleted. In most cases the importing application does not automatically delete its internal object in such a scenario but requests a confirmation from the user.

If PartialExport is true the importing application processes all subobjects which are present in the import file, and leaves unchanged additional subobjects which it can feature in its internal data.

Example instance fragment:

```
<ObjectA ID="1" PartialExport="true" >
  <ObjectB ID="2" Name="ObjectB1" PartialExport="false">
    <ObjectC ID="3" Name="ObjectC1" />
    <ObjectD Name="ObjectD1" ID="4" />
  </ObjectB>
</ObjectA>
```

The meaning of this example is as follows:

ObjectA possesses a subobject ObjectB1 and can also feature further subobjects

ObjectB possesses precisely the subobjects ObjectC1 and ObjectD1 and no further subobjects In specific cases an object type can have "dynamic attributes", i.e. attributes which can either be present or not in one instance of this type and which were possibly even inserted or deleted during the lifetime of an instance. In such a scenario an object (that contains a "Settings" feature with such attributes) can have an optional attribute "PartialAttribute". Just like the PartialExport attribute this attribute relates to the object itself and to all its aggregated subelements, if a subobject does not possess its own PartialAttribute attribute. At the root object the attribute has a default value of "true".

If PartialAttributes is false, the importing application assumes that the import file contains all attributes of the object. If the object already exists and contains additional dynamic attributes, it should be regarded as deleted.

if PartialAttributes is true, the importing application processes all attributes which are present in the import file and leaves additional attributes which it can feature in its internal object unchanged.

PartialAttributes is relevant for attributes which are not dynamic (which are always present in the object instance and cannot be deleted). The importing application always leaves static attributes unchanged if the attribute is not present in the import file.

EXAMPLE:

```
<ObjectB ID="2" Name="ObjectB1">
  <Settings PartialAttributes="true" >
    <Property1>11</Property1>
    <Property2>0.5</Property2>
    <Property3>3</Property3>
  </Settings>
  <ObjectC ID="3" Name="ObjectC1">
    <Settings>
      <PropertyA>11</PropertyA>
      <PropertyB>0.5</PropertyB>
    </Settings>
  </ObjectC>
</ObjectB>
```

ObjectB has the characteristics 1, 2 and 3 and possibly further attributes

ObjectC has precisely the characteristics A and B and no other (dynamic) attributes.

If an exporting application sets PartialExport or PartialAttributes to "true" it must have the capability available to it of specifying that an object or attribute is to be deleted by the import. (Simply not importing the deleted object is not sufficient; the importing application would simply only leave its internal data unchanged).

To this end each object and each dynamic attribute can maintain a "deleted" attribute.

However this flag is not defined by XML@Profibus for attributes. If an application features dynamic attributes (which can be deleted), the schema must declare corresponding types, as in the following example:

Instance:

```
<ObjectA ID="1" PartialExport="true" >
  <ObjectB ID="2" Name="ObjectB1">
    <Settings PartialAttributes="true">
      <Property1 Deleted="true" />
      <Property2>0.6</Property2>
    </Settings>
  </ObjectB>
  <ObjectC ID="3" Name="ObjectC1" Deleted="true" />
</ObjectA>
```

Schema:

```
<xsd:complexType Name="ObjectBSettingsFeatureT">
  <xsd:complexContent>
    <xsd:extension base="prim:FeatureT">
      <xsd:sequence>
        <xsd:element Name="Property1" type="Deletable_integer"
                     minOccurs="0"/>
        <xsd:element Name="Property2" type="xsd:double"
                     minOccurs="0"/>
        <xsd:element Name="Property3" type="xsd:integer
    minOccurs="0"/>
      </xsd:sequence>
    </xsd:extension>
  </xsd:complexContent>
</xsd:complexType>
```

-continued

```
<xsd:complexType Name="Deletable_integer">
  <xsd:simpleContent>
    <xsd:extension base="xsd:integer">
      <xsd:attribute Name="Deleted" type="xsd:boolean"
             use="optional" default="false" />
    </xsd:extension>
  </xsd:simpleContent>
</xsd:complexType>
```

If this attribute is set to "true" the importing application should regard the corresponding object or attribute as deleted. If the object/attribute does not exist in the importing application it can be ignored.

If the Deleted flag is set for an object or attribute, it is not necessary to write the full contents of the element into the export file. It must however be possible for the importing application to identify the object or attribute to be deleted, so that for example the name and/or the idea of an object should have been specified, as well any application-specific identifications which can be present.

If the Deleted flag is used in connection with PartialExport/PartialAttributes set to false, the importing application should also regard the corresponding object or attribute as deleted. This use is however not recommended, the exporting application should simply just not export the corresponding element in order to specify that it has been deleted.

In many scenarios the user can chose whether to export an entire project or only a subtree. As a rule he can select a root object in the tree view and start an export of this object and its subelements using a context menu. Normally not every object in a project hierarchy is meaningful as a root object, only specific types should be used for this purpose.

To ensure that the importing application has access to the complete context information (i.e. the name hierarchy) the parent objects of the selected root object should also be written as "shell objects" into the export file.

```
<Document xmlns="http://www.siemens.com/automation/SimaticML">
<ObjectA ID="1" ShellObject="true">
   <ObjectB ID="2" Name="ObjectB1">
      <Settings>
        <AttributeA>11</AttributeA>
        <AttributeB>some content</AttributeB>
        <AttributeC>0.5</AttributeC>
      </Settings>
   </ObjectB>
</ObjectA>
</Document>
```

In addition to restricting an export using PartialExport" or exporting only a subtree it can also be possible to apply a "filter" to an export. In principle this means that only objects of specific types will be written into the XML file. To designate such a "filter" the project element can maintain an "ExportScope" attribute.

This document does not define any mechanism for formulating such filters. It will be left to the exporting application to determine whether for example filters are fixed or can be user-defined or whether a filter is a "positive list" of exportable types or a "negative list" of filtered types.

Seen from the standpoint of the XML format it is only important for the ExportScope attribute to contain a "filter name" and for the exporting and importing application to share a common understanding of the filter characteristics described by this name.

Figure 1:
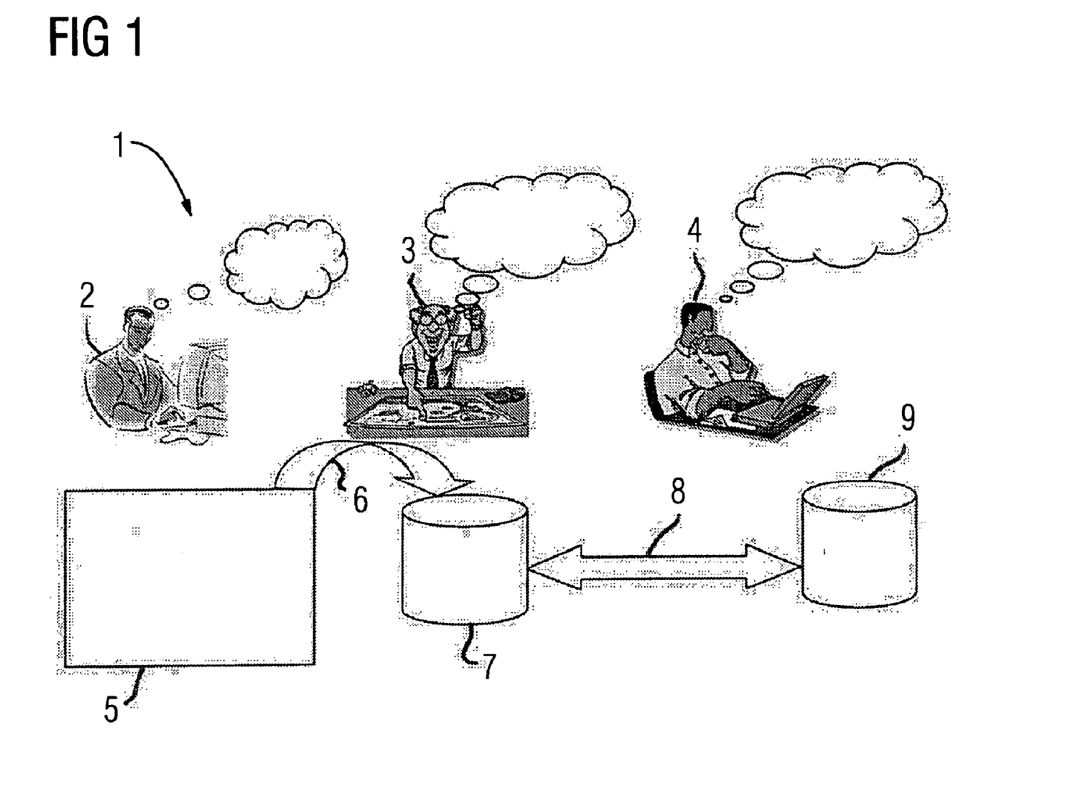
Figure 2:
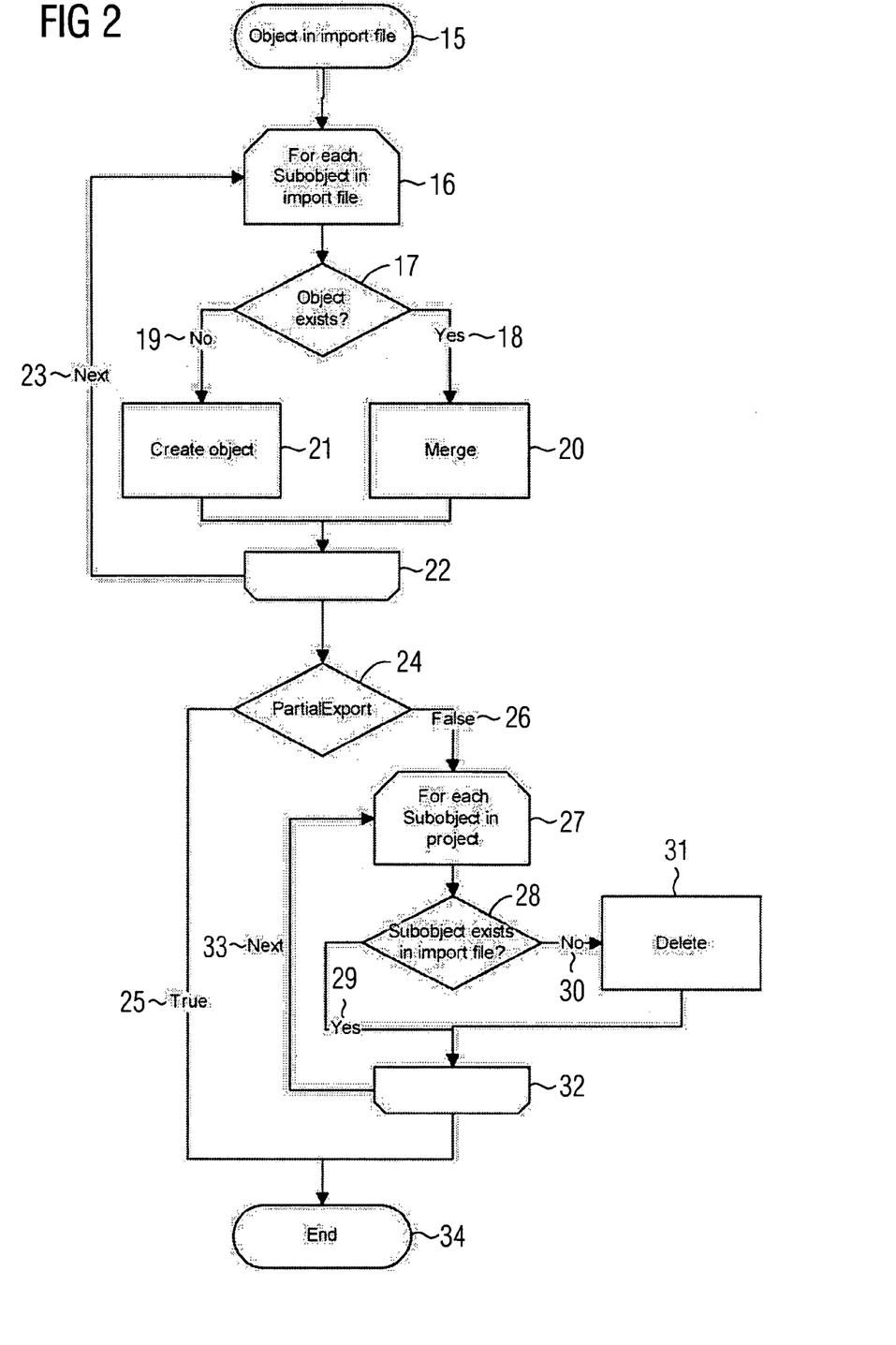
Figure 3:
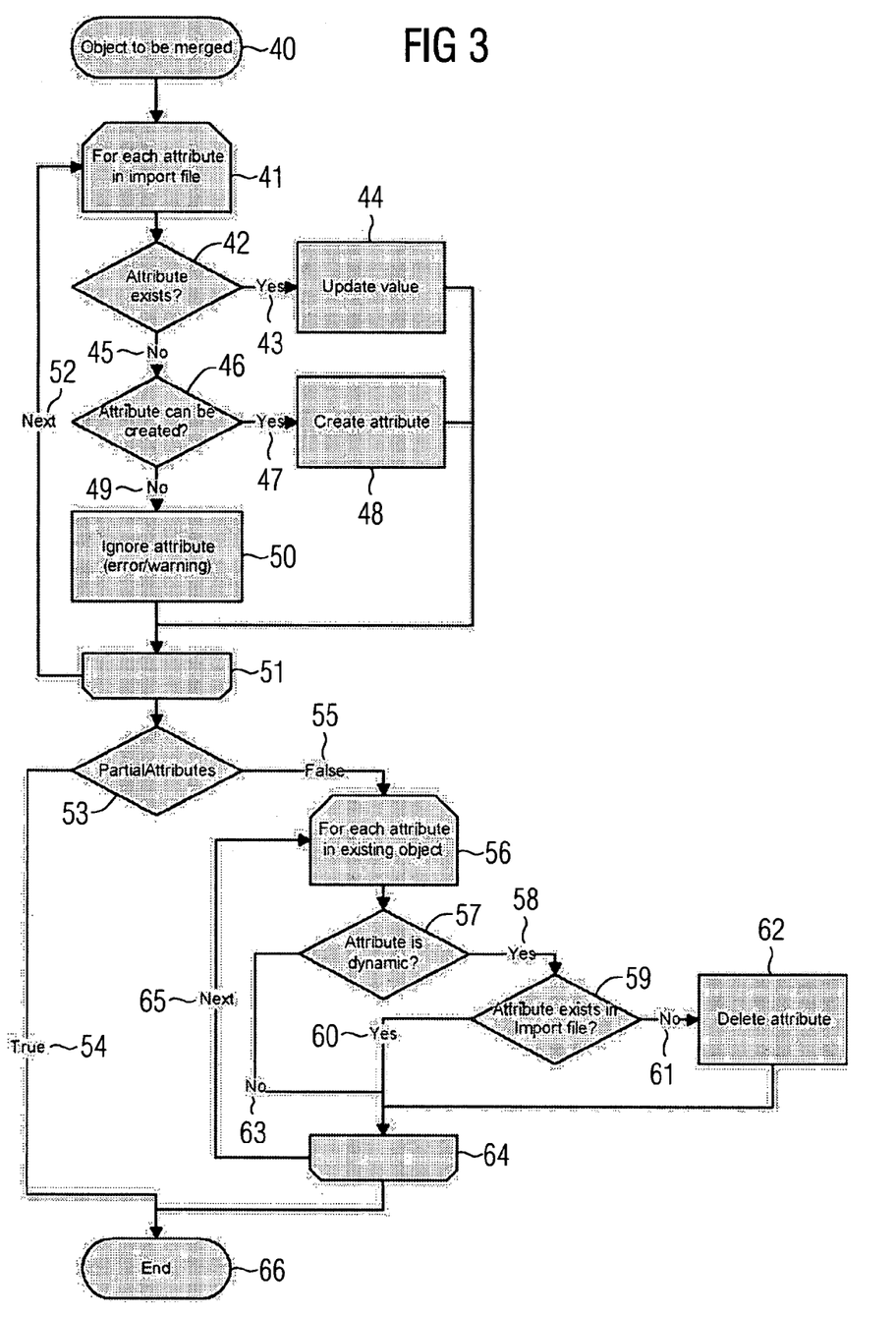
Figure 4:
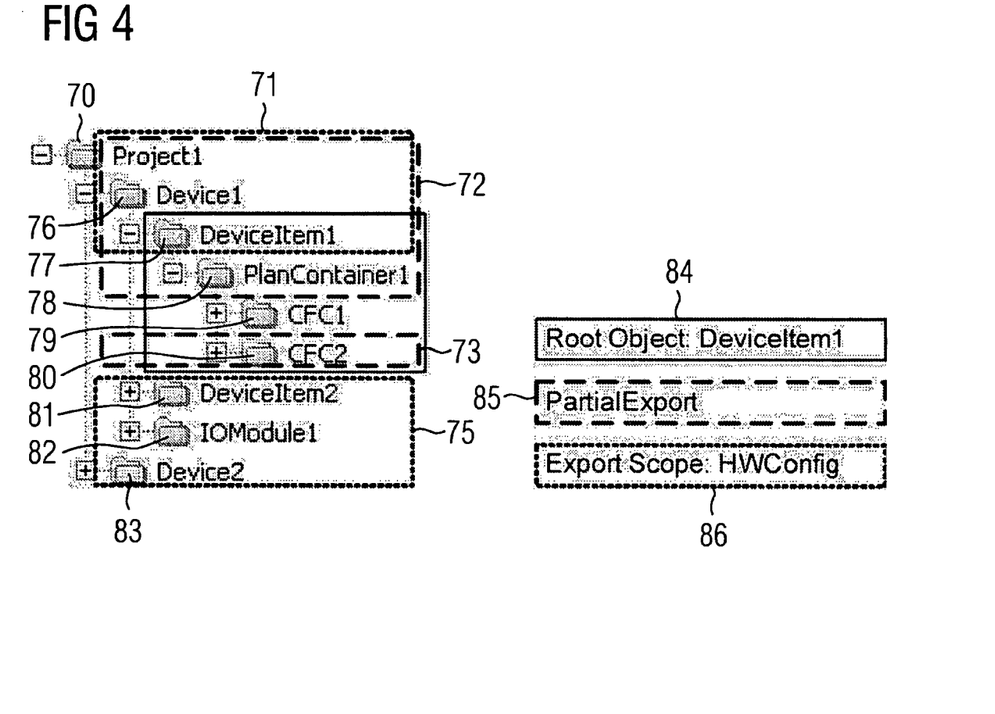

FIG. 4 gives an example for the different options for restricting an export.

Although each XML format with should have been developed with long-term stability as an aim, it is practically unavoidable that a format possibly may have to be changed during the lifecycle of a product or a component. The mechanisms subsequently described in this section of the document can help to make such a change manageable, but it should be noted that resistance to format changes is primarily a question of the "robust implementation" of an import mechanism.

If for example an importing application encounters an unknown element during the analysis of an XML file it could for example deal with the element in a generic way if possible, or it could simply choose to ignore it (and output a warning to the user). It may however under no circumstances crash on encountering such a situation and should not abort the import process.

If an importing application does not find an expected element or attribute when analyzing an XML file it should similarly attempt to use default values despite this.

The precise requirements for the versioning of an import—export functionality can be different for each application, as a rule however it is desirable for the application to not only be able to import current XML files but also files which correspond to a previous version of the XML format.

A point worth noting is the role which an XML scheme file plays in the overall export/import process. An XSD file can have two different purposes:

It can be used for documentation of an export format. By provision of a schema the exporting application can describe what type of XML Instance files it is creating. Such documentation could also be provided as unstructured prose; The use of XSD has the advantage of a formal language to describe the format. The main addressees of this XSD are a human reader who must normally also understand the semantics of the format.

With an XSD file a set of instructions can be checked on the basis of an XML instance file. XSD is only one language for formulating such instructions (others are RelaxNG, Schematron or even regular expressions). Which instructions must be tested on the basis of a specific XML instance can depend on the consumer of the instance and can even vary over the processing chain of the consumer.

In the context of an export/import, a schema (as well as the schema fragments shown during the course of this entire document) mainly has the purpose of describing the XML format. The fact that the instance files can also be validated on the basis of such a schema is secondary—this not solely a guarantee that the instance can be successfully imported.

Changes to an XML former can be classified as a "compatible" or "incompatible". The terms "compatible" and "incompatible" are used below as defined in /XMLPB/. A compatible change is for example the insertion of elements or attributes into existing objects. Incompatible changes are for example deleting or renaming of attributes or structural changes.

If an application has to change its XML format in an incompatible way it should change the namespace to explicitly break the compatibility with the existing format. For this purpose month and year of the scheme version is part of the namespace.

Simultaneously the version number of the schema should also be increased (typically to the next main version number).

An individual XML instance file can combine elements from different versions, i.e. from different namespaces. This allows an importing application—which is not absolutely interested in the complete file—to determine whether it will be affected by an incompatible change.

Theoretically this mechanism can be used individually for each element for each element type. It is however recommended to only use it for the granularity of the possible root objects for an export.

Example 1

In the following example an incompatible change in the format for ObjectA has occurred and has thus been updated in the namespace. The format for the subobject ObjectB is however unchanged. Since ObjectB can also be used as a root object for a partial export, such a partial export is still compatible with the previous version. It can therefore be sensible to leave at the namespace for ObjectB (and all its subelements) unchanged.

Complete export:

```
<Document xmlns="http://www.siemens.com/automation/05/02/
    SimaticML/SW" xmlns:v01="http://www.siemens.com/
    automation/04/12/SimaticML/SW">
    <ObjectA ID="1">
        (...)
        <v01:ObjectB ID="2" Name="ObjectB1">
            (...)
        </v01:ObjectB>
    </ObjectA>
</Document>
Export of sub-tree ObjectB:
<Document xmlns="http://www.siemens.com/automation/04/12/
SimaticML/SW">
    <ObjectB ID="2" Name="ObjectB1">
        (...)
    </ObjectB>
</Document>
```

If the parent Objects of the relevant sub-tree are exported as shell objects (which is typically the case), these shell objects should also be stored in the original namespace. Otherwise and importing application could possibly not recognize them and would not be in a position to navigate to the relevant sub-tree (ObjectB in the example).

```
<Document xmlns="http://www.siemens.com/automation/04/12/
SimaticML/SW">
    <ObjectA ID="1" ShellObject="true" >
        <ObjectB ID="2" Name="ObjectB1">
            (...)
        </ObjectB>
    </ObjectA>
</Document>
```

Example 2

In this example the format for the subobject ObjectB will be changed so that it is incompatible but the remainder of the XML format (for the objects A, C etc.) remains unchanged. In can be sensible to use only one updated namespace for the sub-tree beginning with ObjectB. This can be sensible if it is apparent that export files do not contain any instances of ObjectB (if and optional element is involved) or that import clients exist to which ObjectB does not matter.

```
<Document xmlns="http://www.siemens.com/automation/04/12/
    SimaticML/SW" xmlns:v02="http://www.siemens.com/
    automation/05/02/SimaticML/SW">
    <ObjectA ID="1">
        (...)
        <v02:ObjectB ID="2" Name="ObjectB1">
            (...)
        </v02:ObjectB>
        <ObjectC ID="3">
            (...)
        </ObjectC>
    </ObjectA>
</Document>
```

This mechanism of combining namespaces should be used with care since it makes both the instance files and also the schema definitions increasingly complex and less readable. In most cases an incompatible change affects the entire format so that all elements are to be relocated simultaneously to the new namespace.

Figure 5:
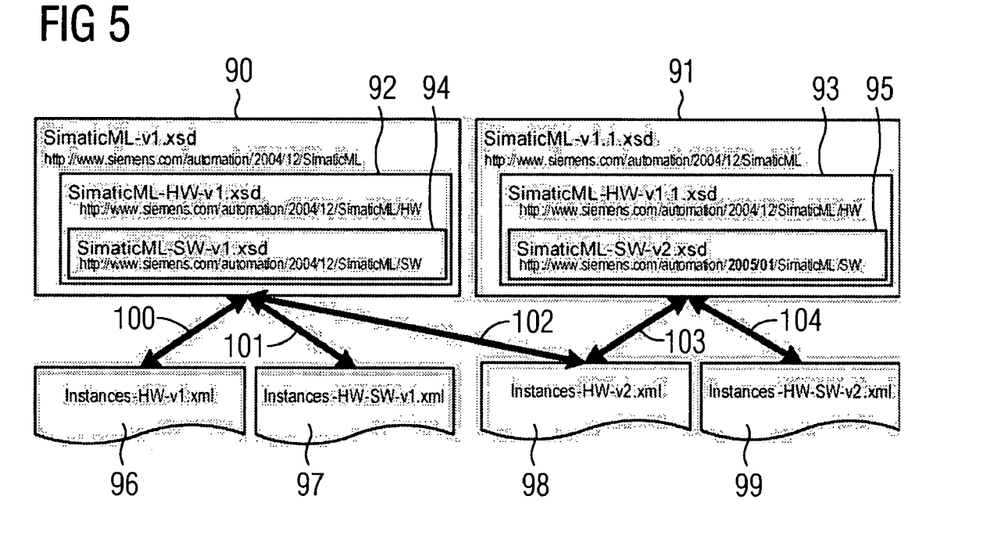

Namespace hierarchies:

In the case of nested namespaces and schemas an incompatible change of a nested namespace does not break the compatibility of instance files which do not use this specific subsystem. FIG. 5 shows an example.

The namespace for the SW scheme is changed to break compatibility.

The schema files which import the SW schema must be adapted but maintain their namespace Instance files which do not contain any SW-relevant elements correspond both to the old and also to the new schema.

Applications which are not interested in SW-related elements must be adapted to a new version In the case of a compatible change only the version number of the XML format is increased (typically to the next minor version number) the namespace remains unchanged. As defined by XML@Profibus the version number is part of the document header part in each instance file as well as of an XML schema file:

Instance:

```
<Document xmlns="http://www.siemens.com/automation/04/12/
SimaticML/SW">
    <prim:DocumentInfo Version="0.04">
        <prim:Created Tool="PCS7" User="np"
        Timestamp="2004-11-09T08:52:37"/>
    </prim:DocumentInfo>
    <ObjectA ID="1">
        (...)
    </ObjectA>
</Document>
```

Schema:

```
<xsd:scheme
    targetName-pace="http://www.siemens.com/automation/2004/12/
    SimaticML"
    xmlns:xsd="http://www.w3.org/2001/XMLSchema"
    xmlns:prim="http://www.profibus.com/Common/2003/11/Primitives"
    Version="0.04" >
    <xsd:import Namespace="http://www.profibus.com/Common/2003/
        11/Primitives" schemaLocation="Common-
        Primitives-v1.0.xsd" />
    <xsd:element Name="Document" type="prim:DocumentT" />
    (...)
<xsd:scheme>
```

On the basis of this version number of the importing application can define how the import is to be conducted.

If the version number is smaller than the "current version" of the application it can call a transformation or adapt the import routines in order to deal with the old data former (it can be sufficient to supply default values for the attributes missing in the import file).

If the version number is equal to or greater than at the expected version, the application can rely on the file containing all expected elements in the expected format, but must be prepared to encounter compatible expansions (e.g. additional attributes or elements).

In accordance with XML@Profibus each object in an XML export file can maintain an optional version attribute. With this attribute and exporting application can write the "project version number" of this object into the internal data representation.

This can be especially significant if an application can handle a number of versions of objects in a project. (a discussion of version mechanisms within an application and their data representation goes beyond the framework of this document however).

It must be pointed out that the XML format for instances of the same type in the same file must be identical (i.e. must correspond to the same schema), even if its data version is different. To put it in another way, an XML export always creates an export file which corresponds to a specific version even when the internal data representation can contain objects of different versions.

Specific objects can additionally contain "version information", e.g. something like "firmware Version" or a version number which was freely selected by the user. From the standpoint of the export/import and of the XML format such an attribute is handled exactly like any other object attribute (such as a comment field for example) and is stored in the "settings" feature of the object.

The following instance fragment shows examples for all types of version information:

```
<Document xmlns="http://www.siemens.com/automation/2004/
    12/SimaticML" xmlns:prim="http://www.profibus.com/
    Common/2003/11/Primitives">
  <prim:DocumentInfo Version="0.04">
    <prim:Created Tool="notepad" User="np3304"'/>
  </prim:DocumentInfo>
  <ObjectA ID="1" Version="6.1">
    <ObjectB ID="2" Name="ObjectB1">
      <Settings>
        <Property1>11</Property1>
        <Property2>0.5</Property2>
        <UserVersion>17</UserVersion>
      </Settings>
    </ObjectB>
  </ObjectA>
</Document>
```

An export file can possibly contain only parts of a project. It is therefore possible for a relation of an exported object to relate to an object which is not part of the export.

Figure 6:
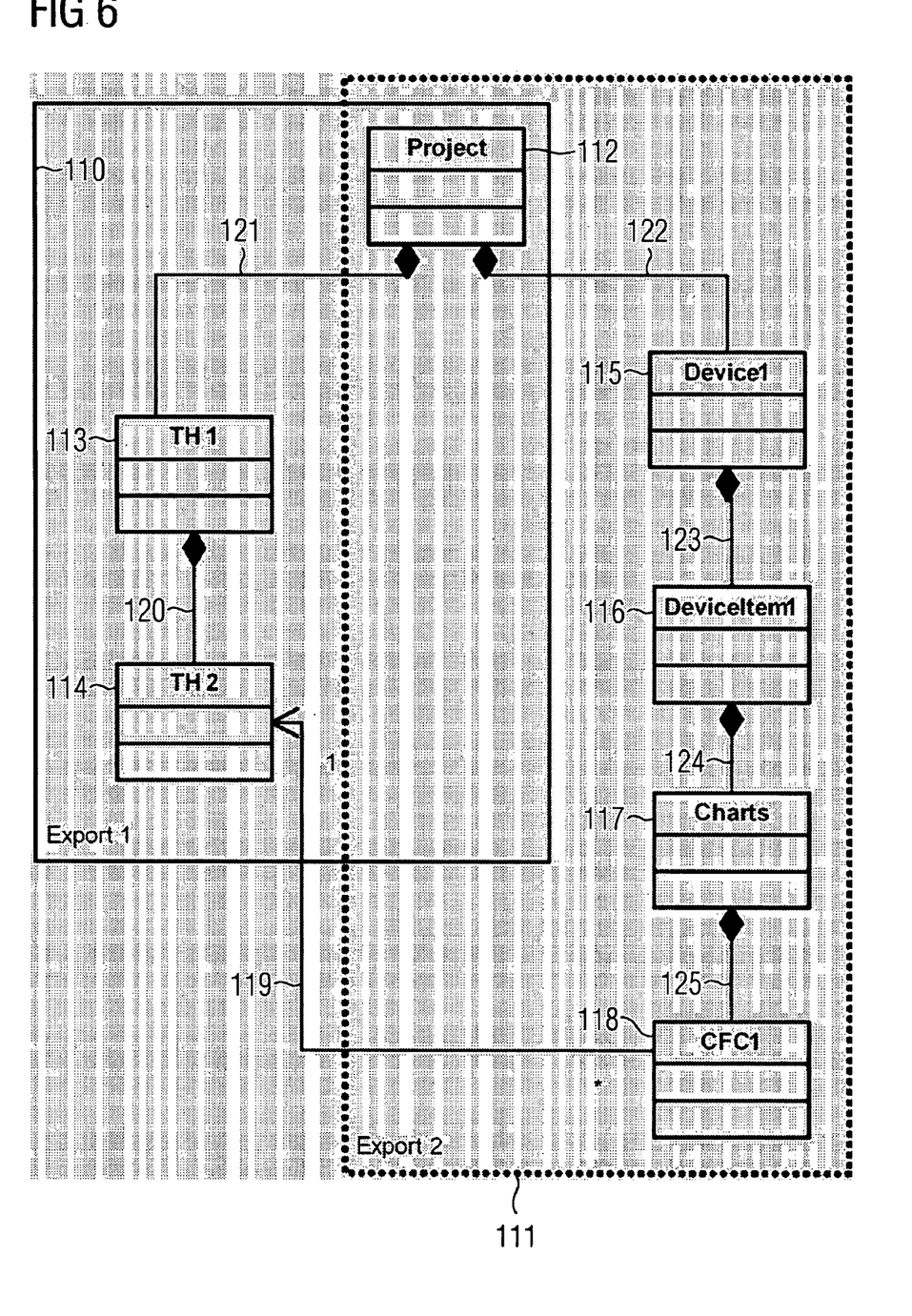

The following diagram shows an example; The relation between "TH 2" and "Cfc 1" can be exported both Export 1 and also in Export 2 only as an "external reference". It is necessary for an importing application to be able to create the relation anew after the import of Export1 and Export2, with the sequence of the partial imports not needing to be relevant.

On import of an external reference the importing application must be in a position to resolve the reference correctly, especially if the reference object already exists (e.g. as a result of a previous import) or the referenced object is completely created via a subsequent (partial) import.

The same mechanisms should be available for the identification of a target object as for any other imported object. To this end the target object is exported as a "shell object", which means that it is written into the export file as a "placeholder" without its contents (settings" subobjects and other relationships). Such a shell object maintains its complete name hierarchy in a "path" attribute in addition to the local name (so that the importing application has access to the full name hierarchy)

The "external" relation can now be written in XML precisely like an internal relation, since both the source and also the target object possess a representation in the XML file.

```
<ObjectA ID="1">
  <ObjectC Name="ObjectD3" ID="3">
    <Relations>
      <RelatesTo Target="#4"/>
        <ObjectB Name=" ObjectB1" ID="4"
        Path="ObjectA" ShellObject="true">
          <prim:AppId AppName="SIMATIC"
  Value="0002001E10000002"/>
          <prim:AppId AppName="OtherTool"
            Value="0815"/>
        </ObjectB>
      </RelatesTo>
    </Relations>
  </ObjectC>
</ObjectA>
```

If a number of instances in a file are related to the same external instance, each relation writes its own shell object. These shell objects possess their own unique ID (to ensure that the ID is unique within a file), but relate to the same target object (i.e. point to the same name, path and the same App IDs).

```
<Device>
  <DeviceItem>
    <Charts>
      <CFC Name="motor" ID="DT0001001A10000624" Version="V6.1">
        <prim:AppId AppName="SIMATIC"
          Value="DT0001001A10000624" />
        <Settings />
      <Relations>
        <PlantHierarchy Target="#12" >
          <PlantHierarchyFolder Name="GF34_Befuellen" ID="12"
            Path="Rubi_AS2_Prj/Rubin/MB3101"
            ShellObject="true">
          <prim:AppId AppName="SIMATIC"
            Value="OD01101071:00000029:00000000:00000000" />
          <prim:AppId AppName="OtherTool" Value="0816" />
          </PlantHierarchyFolder>
        </PlantHierarchy>
      </Relations>
      </CFC>
      <CFC Name="motor" ID="DT1A0001001" Version="V6.1">
        <prim:AppId AppName="SIMATIC"
          Value="DT0001001A10000625" />
        <Settings />
        <Relations>
          <PlantHierarchy Target="#13" >
            <PlantHierarchyFolder Name="GF34_Befuellen" ID="13"
              Path="Rubi_AS2_Prj/Rubin/MB3101"
              ShellObject="true">
            <prim:AppId AppName="SIMATIC"
  Value="OD01101071:00000029:00000000:0000000 />
            <prim:AppId AppName="OtherTool" Value="0816" />
```

-continued

```
        </PlantHierarchyFolder>
       </PlantHierarchy>
      </Relations>
     </CFC>
   </Charts>
  </DeviceItem>
</Device>
```

To summarize, the invention thus relates to a method as well as to a system for synchronization of data between applications in which the data is exchanged at least partly between the applications, with the exchanged data being synchronized with data present in the respective application. To simplify the synchronization it is proposed that the data is assigned an identification that signifies incompleteness.

The invention claimed is:

1. A method for synchronization of data between applications, comprising:

assigning an export attribute to an object in an export file which relates to the object itself and to all aggregated subobjects of the object except those aggregated subobjects having been assigned their own export attribute, wherein the export attribute identifies whether exporting of the export file to an importing application as an import file is a full or partial export;

assigning a delete attribute to the object in the export file which relates to the object itself and to all aggregated subobjects of the object except those aggregated subobjects having been assigned their own delete attribute, wherein the delete attribute identifies whether objects are to be deleted;

exchanging at least a part of the data between the applications by reading the export and delete attributes during exchange of data between applications and (a) if the export attribute is identified as a full export, the importing application processes the exchange of the data by identifying subobjects included by the importing application but not included in the import and deleting said identified subobjects only when said subobject includes the delete attribute;

(b) if the export attribute is identified as a partial export, then the importing application processes the exchange of the data by leaving unchanged any additional subobjects already existing in the importing application;

thereby synchronizing the exchange of data respective between applications.

2. The method as claimed in claim 1, wherein the at least part of the data exchanged is in the form of shell objects, wherein the shell objects having attributes for identification, wherein the shell objects only being parts of a complete object.

3. The method as claimed in claim 1, wherein the exchanged data is described in an Extensible Markup Language.

4. The method as claimed in claim 1, wherein after an import of data, the type of data changes is detected via a version identifier and a generic reaction occurs depending on the version identifier.

5. The method as claimed in claim 1, wherein for a case of data which has already been synchronized, only the changes are exchanged for subsequent synchronizations.

6. The method as claimed in claim 1, wherein for export of data a root object is selected as from which all objects will be exported.

7. The method as claimed in claim 1, wherein filter settings are defined, and a selection of the data to be exchanged is made based on the filter settings.

* * * * *